United States Patent [19]
Bonetti et al.

[11] Patent Number: 5,495,388
[45] Date of Patent: Feb. 27, 1996

[54] DISCONNECTABLE SWITCH

[75] Inventors: Luigi Bonetti; Renato Dosmo, both of Bergamo, Italy

[73] Assignee: Abb Sace Spa, Bergamo, Italy

[21] Appl. No.: 230,799

[22] Filed: Apr. 21, 1994

[30]     Foreign Application Priority Data

Apr. 21, 1993  [IT]  Italy .................... MI93A0785
Apr. 21, 1993  [IT]  Italy .................... MI93A0790

[51] Int. Cl.⁶ .................................... H02B 1/04
[52] U.S. Cl. .............. 361/609; 200/50 AA; 361/616
[58] Field of Search ............... 211/26, 41; 439/310, 439/535, 362, 364; 200/50 R, 50 A, 50 AA, 51 R; 361/605, 608, 609, 615, 616

[56]            References Cited
            U.S. PATENT DOCUMENTS

| 3,626,253 | 12/1971 | Sturdivan | 361/608 |
|---|---|---|---|
| 3,633,075 | 1/1972 | Hawkins | 361/609 |
| 3,790,861 | 2/1974 | Sakats | 361/609 |
| 4,355,269 | 10/1982 | Burton | 361/609 |
| 4,703,137 | 10/1987 | Bohnen | 200/50 AA |

FOREIGN PATENT DOCUMENTS 853306  10/1970  Canada ................. 200/50 AA

*Primary Examiner*—Gerald P. Tolin
*Attorney, Agent, or Firm*—Burns, Doane, Swecker & Mathis

[57]            ABSTRACT

The switch cabinet (50) exhibits a housing, which is provided with a door and which includes a box-shaped switch (1). The switch (1) can be brought by a pushing movement inside the switch cabinet (50) into a connected position or into a disconnected position, and exhibits a fixed part (2) mounted in the switch cabinet housing, and a movable housing body (3) which interacts with the fixed part (2) and can be removed from the housing. Furthermore, the switch (1) contains a disconnecting device for achieving the disconnected position or the connected position, and a switching lever (4) guided to the outside through a first opening (6) provided in the door (7). Provided in the door (7) of the switch cabinet housing is a second opening (11) which serves to guide through a tool (8) which facilitates the operation of the disconnecting device with the door (7) closed.

This switch cabinet fulfills particularly strict safety requirements.

11 Claims, 13 Drawing Sheets

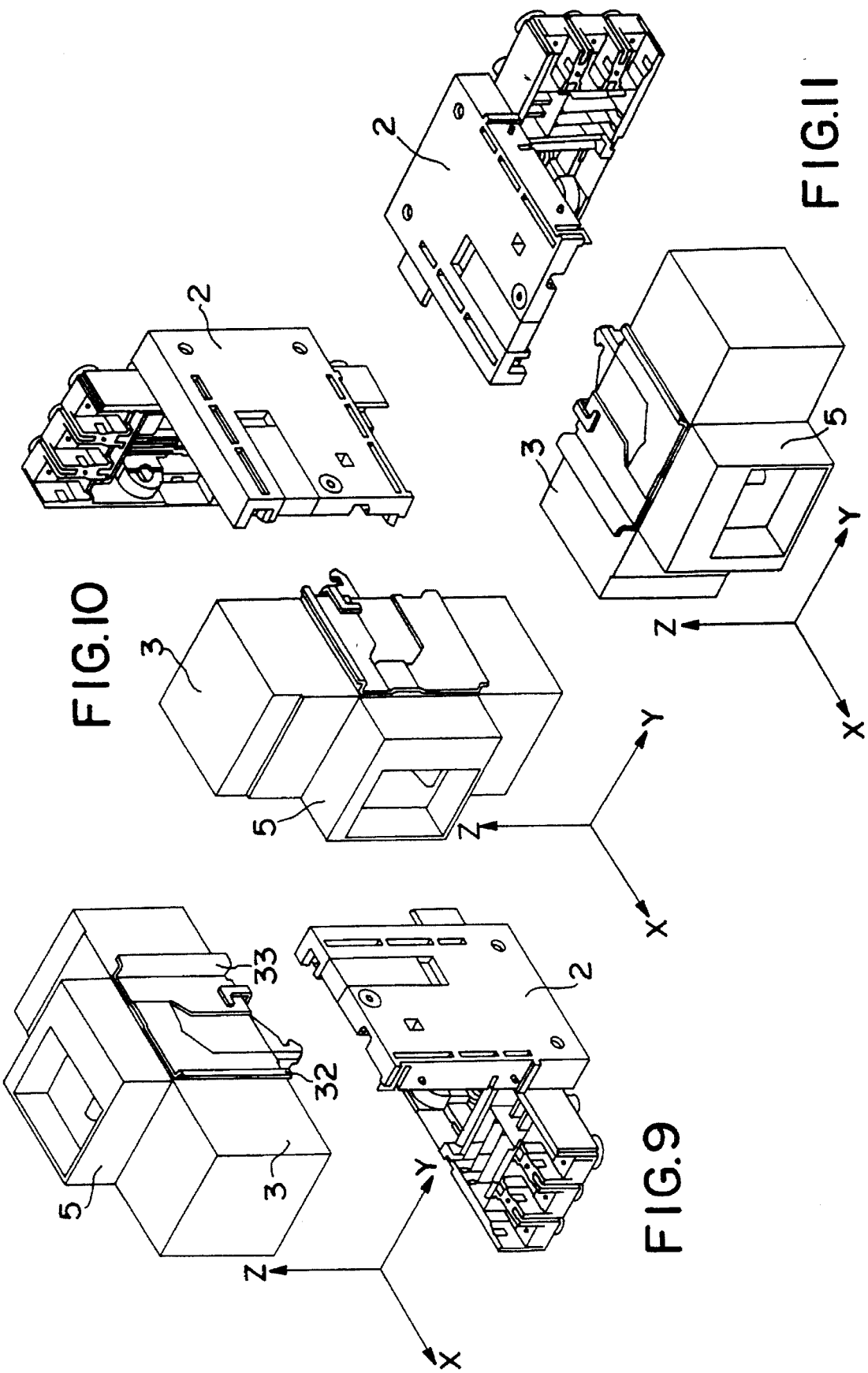

5,495,388

DISCONNECTABLE SWITCH

BACKGROUND OF THE INVENTION

1. Field of the Invention

The invention proceeds from a switch cabinet having a housing exhibiting a door and having a box-shaped switch which can be brought in the switch cabinet by means of a pushing operation into a connected position or into a disconnected position, the switch containing a fixed part mounted in the housing, a movable housing body which interacts with the fixed part and can be removed from the housing, a disconnecting device for achieving the connected position or the disconnected position, and a switching lever guided to the outside through a first opening provided in the door.

2. Discussion of Background

A connected position or disconnected position is understood here to mean a position of the switch in which a housing body containing the power contacts of the switch is electrically connected or disconnected from contact pieces for the electrical power supply and for the electrical power distribution. These contact pieces are located in a fixed part of the switch which is mounted in the switch cabinet. The front of the switch, on which a switching lever is mounted, usually projects from the switch cabinet door in order to facilitate actuation of the switch from outside without the need to open the switch cabinet door. A switch cabinet of the type mentioned at the beginning therefore fulfills comparatively strict safety regulations and simultaneously facilitates simple inspection and simple replacement of the power contacts of the switch. In this case, the movable housing body of the switch which contains the power contacts is disconnected from the fixed part of the switch which is arranged in the interior of the switch cabinet, and is moved from the interior of the switch cabinet.

In order to achieve the disconnected position or the connected position of the switch, the normal procedure is for the housing body containing the power contacts to be removed from the fixed part of the switch or to be inserted into the fixed part using a disconnecting device provided in the interior of the switch cabinet. However, in this case the door of the switch cabinet has to be opened. In the process, however, it is possible for the operating staff to come into contact with live parts or with accidental arcs.

SUMMARY OF THE INVENTION

Accordingly, one object of the invention is to provide a novel switch cabinet of the type mentioned at the beginning in which the work of assembly and maintenance can be carried out virtually without risk.

The switch cabinet according to the invention is defined in that the switch can be brought from the connected position into the disconnected position and inversely from the disconnected position into the connected position without having to open the door of the switch cabinet. This excludes any risk of accident during the phases of disconnection and connection.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which refer to particularly preferred exemplary embodiments of the switch according to the invention and wherein:

FIGS. 9, 10 and 11 show various possibilities with respect to the arrangement of the switch in accordance with FIGS. 3 to 8 in the switch cabinet.

DESCRIPTION OF THE PREFERRED EMBODIMENTS

Figure 1:
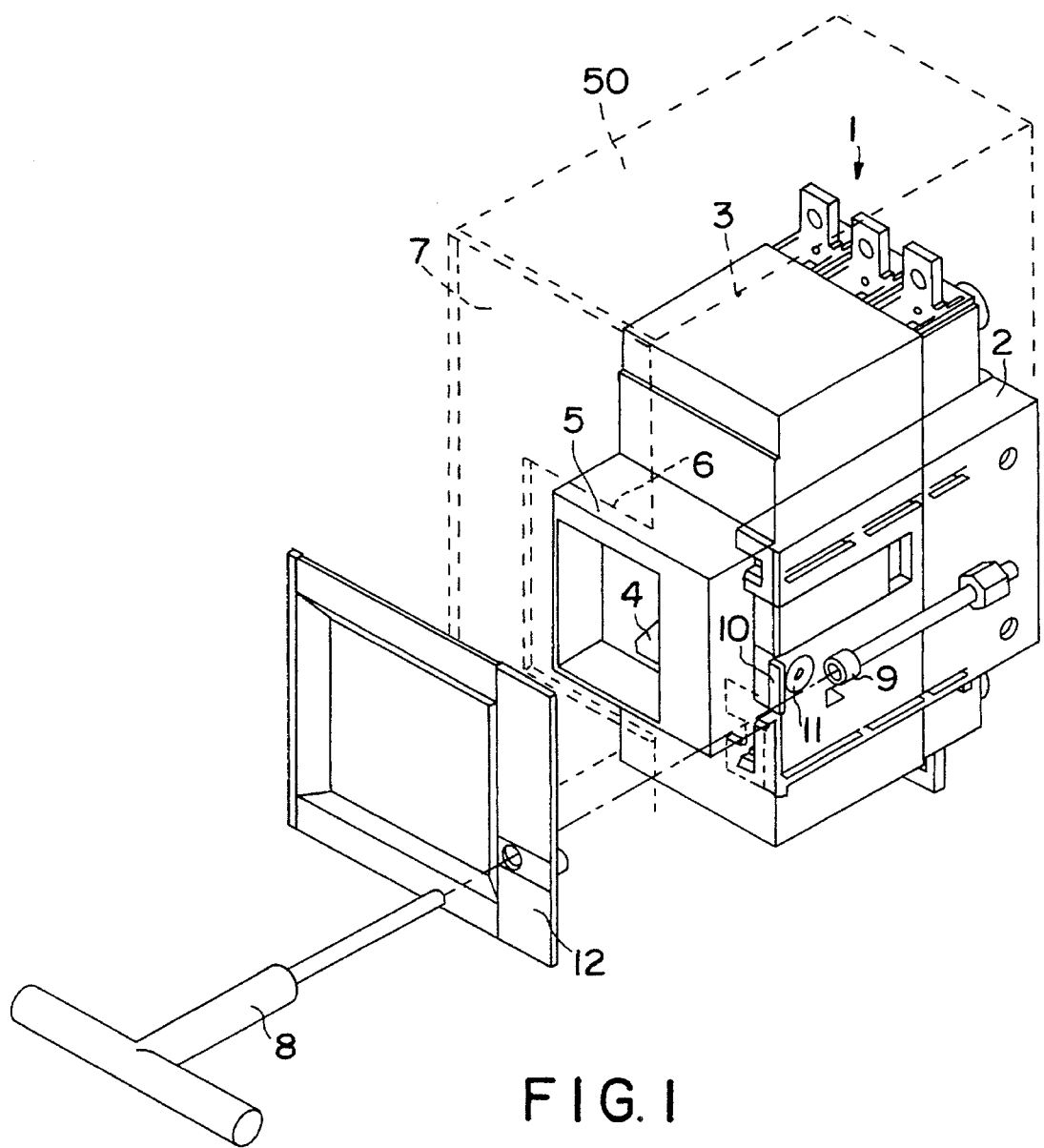
FIGS. 1 and 2 respectively show in a schematic representation and in a perspective view a switch cabinet constructed in accordance with the present invention and having a switch.

Referring now to the drawings, wherein like reference numerals designate identical or corresponding parts throughout the several views, it may be seen from FIG. 1 that a switch 1, which is of three-phase design and provided for voltages of up to typically 500 V, is assembled from a fixed part 2, which is mounted in an electric switch cabinet 50, and a movable box-shaped housing body 3. When the housing body 3 is inserted into the fixed part 2 of the switch, current fed in from the input contacts flows via the switch to the distribution contacts. This current flow can be interrupted with the aid of a switching lever 4, which projects from the front of the switch cabinet.

Figure 2:
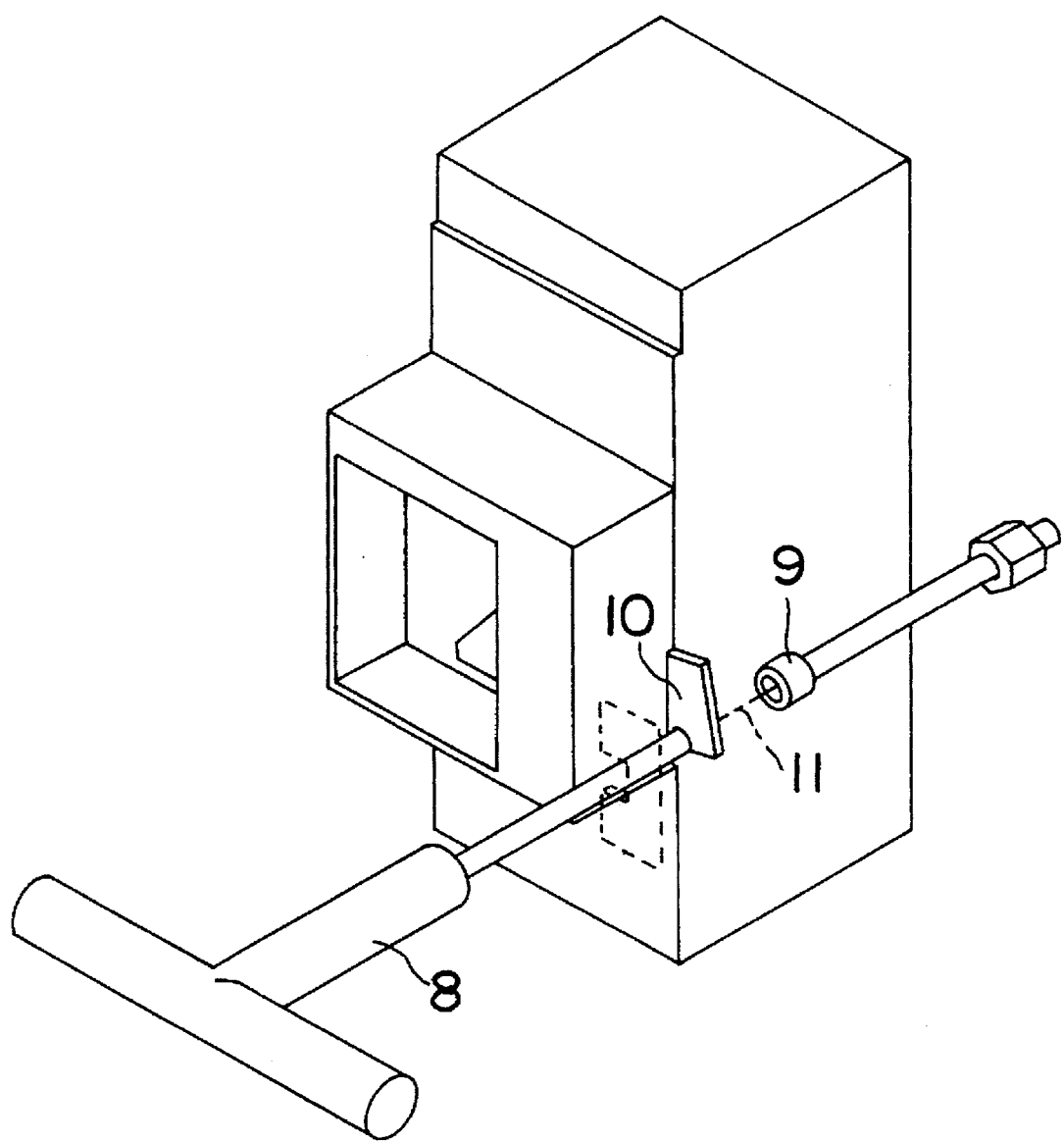

Projecting from the front of the switch 1 is a cover or an additional unit 5, which is guided through an opening 6 which is provided in a door 7 of the switch cabinet 50 accommodating the switch 1. The door 7 of the switch cabinet exhibits a further opening 11, with the result that it is possible by means of a tool 8, such as a key or a means which acts appropriately, to act on an actuating shaft 9 by means of which it is possible to activate a disconnecting device which is described in further detail below. In the additional unit 5, the switching lever 4 permits activation of a blocking lug 10 which in turn permits the opening 11 arranged in the door 7 of the switchboard to be blocked or released. In FIG. 1, the blocking lug 10 is located in a position in which the opening 11 is released, with the result that it is possible to engage the actuating shaft 9 without hinderance by means of the tool 8, whereas in FIG. 2 the blocking lug 10 is located in a position in which the opening 11 is covered, thus preventing the possibility of reaching the seat of the actuating shaft 9 with the tool 8. The switching lever 4 of the housing body 3 is then, to be precise, located in a position in which the switch is closed.

As may be seen from FIG. 1, the additional unit 5 projects outwards through the wall of the door 7. It is advantageous for the additional unit 5 and the opening 6 of the door 7 to be masked on the outside of the door by a cover 12 which exhibits the opening 11 for the tool 8.

Figure 3:
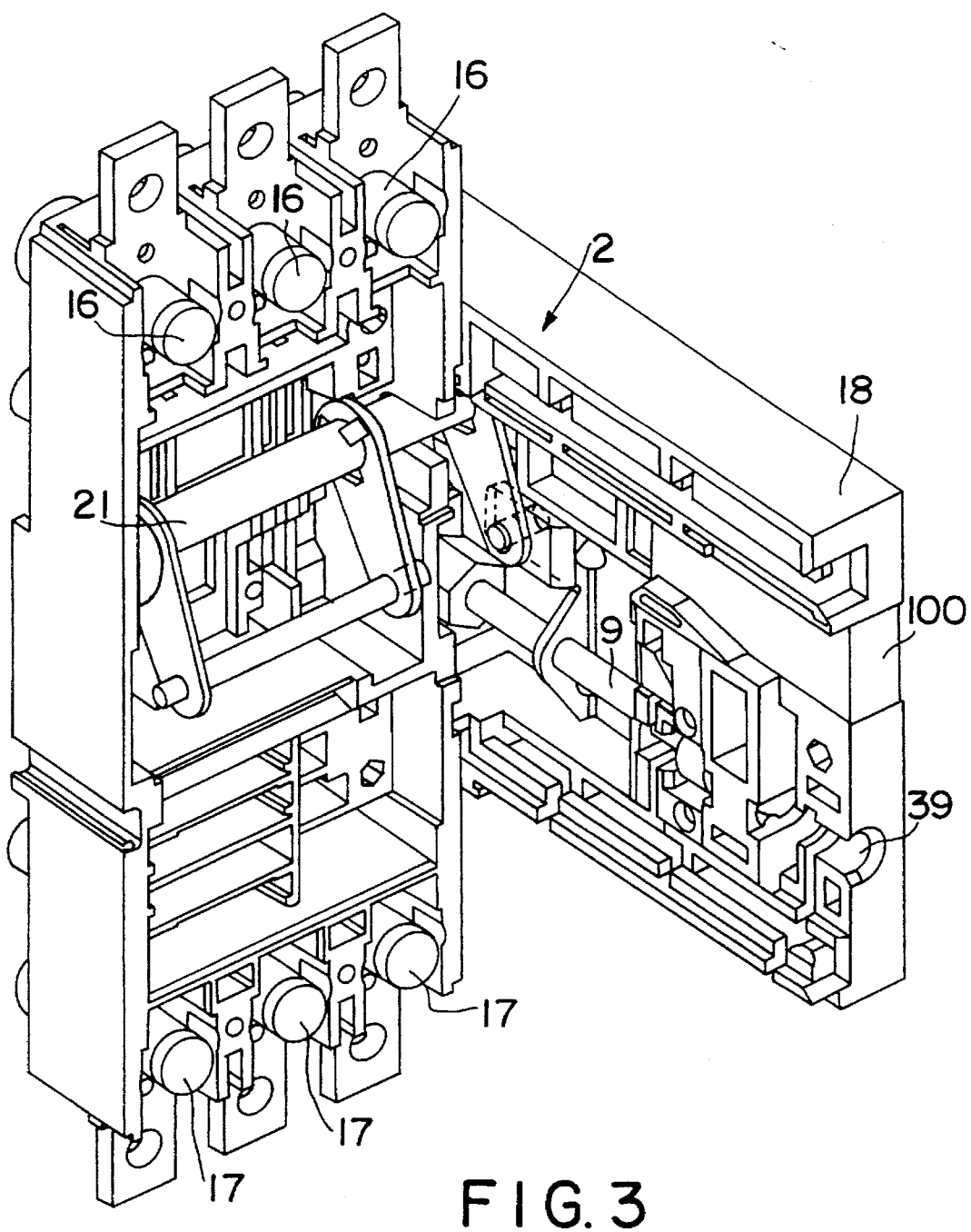
FIG. 3 shows a part, constructed in a fixed manner, of the switch represented in FIGS. 1 and 2, which is mounted in the interior of the switch cabinet and exhibits a part, constructed as a lever mechanism, of a disconnecting device.

The fixed part of the switch can be seen in a perspective view in FIG. 3. Connecting terminals (not shown) for the electrical power supply are provided on the top side, and connecting terminals (likewise not shown) for the electrical power distribution are provided on the underside. Provided on the connecting terminals for the electrical power supply or the electrical power distribution are contact pieces 16 and 17, which can be brought into or out of electrically conductive engagement with hollow mating contact pieces which are arranged on the housing body 3 of the switch and are connected in an electrically conductive fashion to the contact arrangement of the switch 1 which can be actuated by the switching lever 4. The design and the arrangement of this total of 6 mating contact pieces 116 and 117 can be seen from FIG. 8, and their interaction with the contact pieces 16 and 17 can be seen from FIGS. 12 and 13.

The fixed part exhibits a housing body, constructed in the shape of an L, which has a side part 18 which is constructed as a limb of the L and serves to guide the switch 1 and to accommodate the actuating shaft 9. The contact pieces 16 and 17 can be brought into or out of engagement with the mating contact pieces by means of the actuating shaft. Provided on the front of the side part 18 is an opening 39 which facilitates the insertion of the tool 8 into the interior of the side part 18 onto a free end, constructed in a profiled manner, of the actuating shaft 9.

Figure 4:
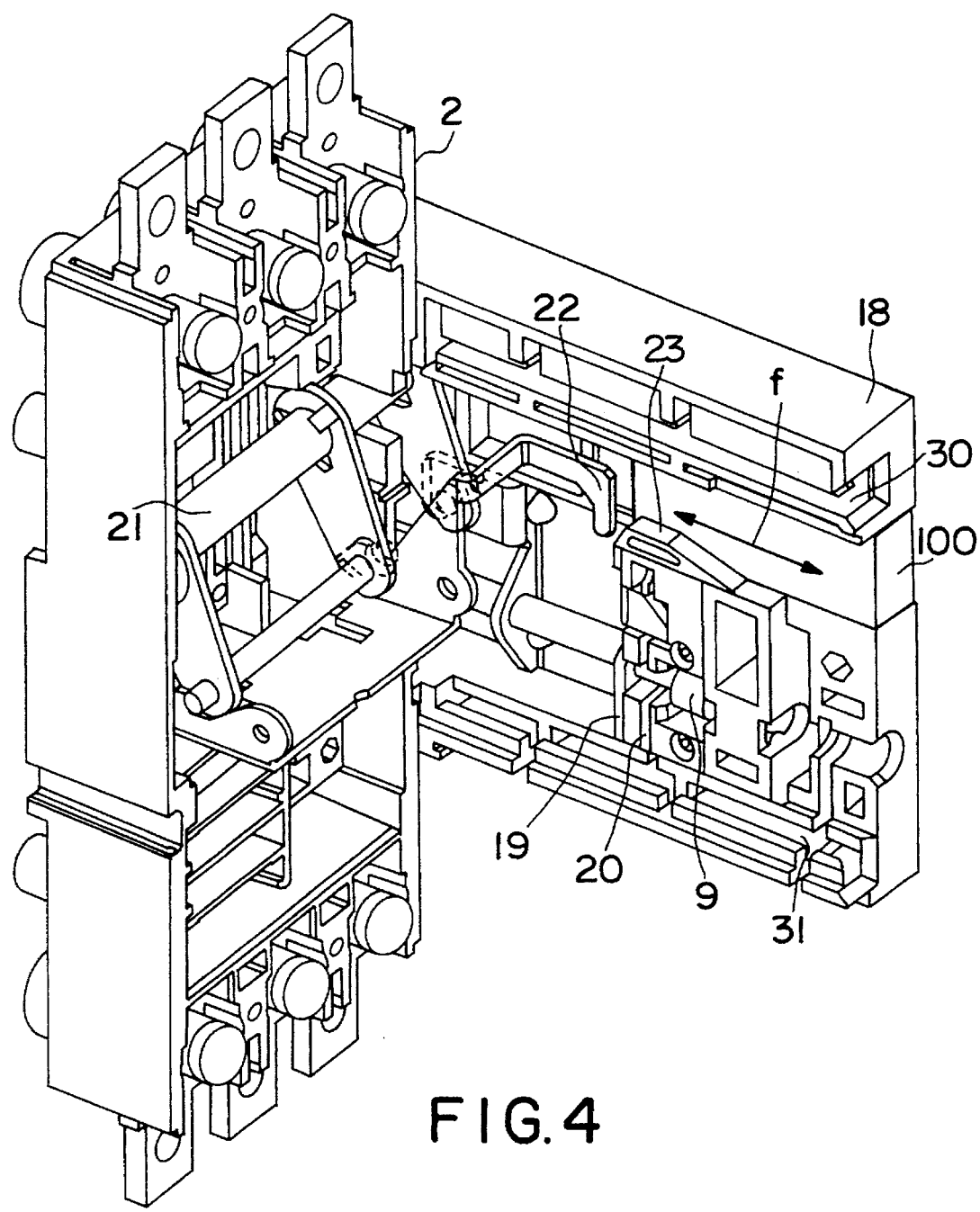
FIG. 4 shows the part in accordance with FIG. 3 and constructed in a fixed manner, in which there is now additionally represented a coupling device of the disconnecting device which is pivotably mounted on a movable housing body of the switch.

It may be seen from FIG. 4 that the actuating shaft is rotatably mounted in the side element 18. The actuating shaft 9 is a spindle with an external thread and interacts with a driver carriage 19 which can be displaced along the spindle axis and acts on the housing body 3 of the switch 1. Upon rotation of the actuating shaft 9, the driver carriage 19, and thus also the housing body 3 of the switch 1, are displaced in the direction specified by an arrow f. 20 designates a blocking platelet.

The housing body of the fixed part accommodates a lever mechanism 21 for coupling the movable housing body 3 of the switch. This lever mechanism interacts with a coupling device which is pivotably mounted on the movable housing body 3 and exhibits a hook 22. The hook 22 can be pivoted in the disconnected position by inserting a push button 100 which is rigidly connected to a control link 23.

Figure 5:
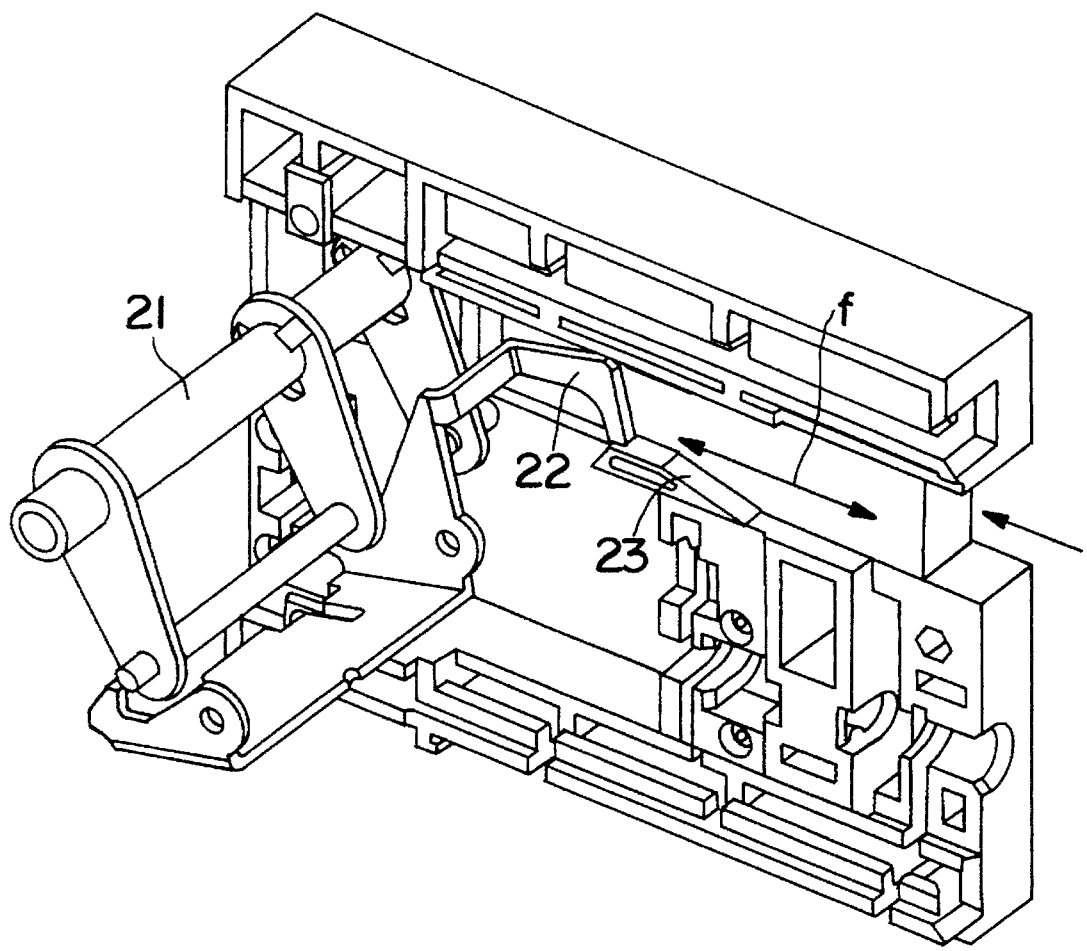
FIG. 5 shows the disconnecting device in accordance with FIGS. 3 and 4 in the case of unlatching or latching of the coupling device and lever mechanism.

As may be seen from FIG. 5, upon insertion of the push button 100 the hook 22 pivots upwards, thus cancelling the coupling of the pivotable coupling device to the lever mechanism 21. The movable housing body 3 of the switch 1 can then be pushed out of the fixed part 2. This pushing movement is facilitated by two guide grooves 30 and 31 (FIG. 4), which are arranged in the side part 18 and constructed in an undercut manner and which serve to accommodate a profile of the switch which can be displaced in these grooves.

Figure 6:
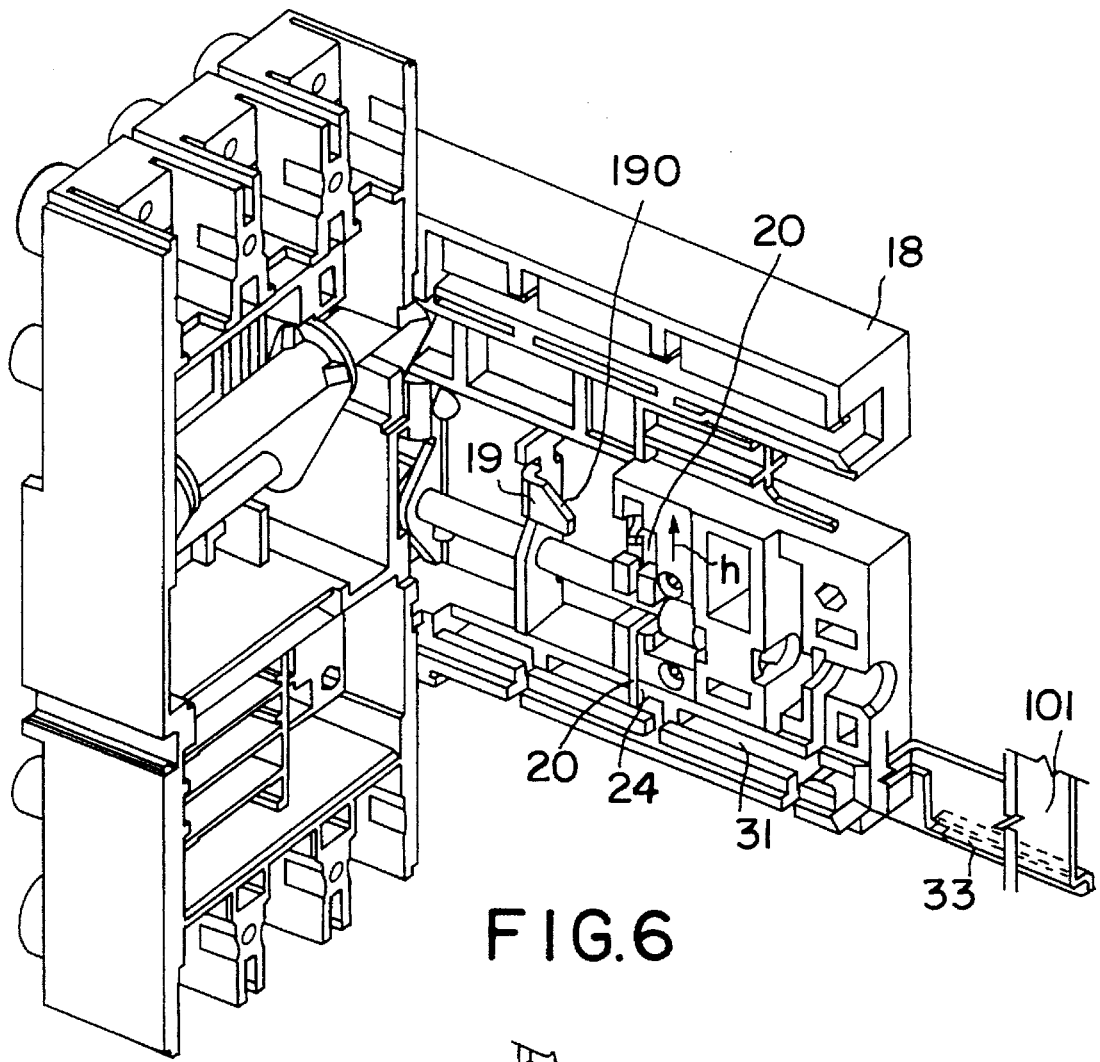
FIG. 6 shows the disconnecting device in accordance with FIGS. 3 and 4 in a state in which it is impossible to displace the housing body in the fixed part of the switch.
Figure 7:
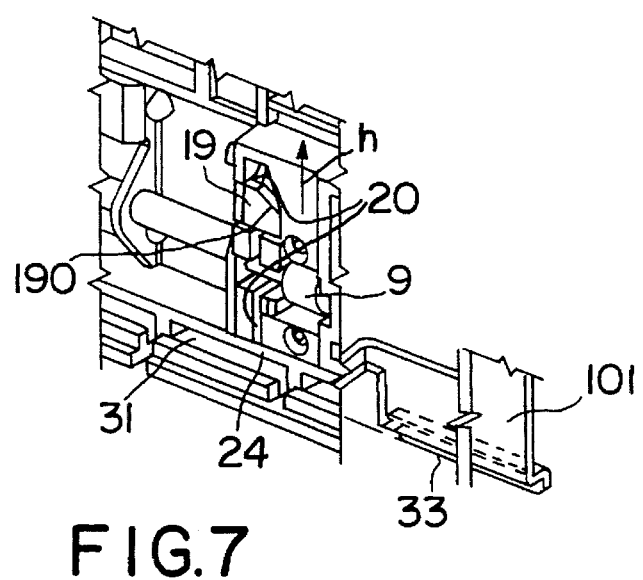
FIG. 7 shows the disconnecting device in accordance with FIGS. 3 and 4 in a state in which it is possible to displace the housing body in the fixed part of the switch.

The mode of operation of the blocking platelet 20 can be seen from FIGS. 6 and 7. When, with the housing body 3 removed, the driver carriage 19 is located in a different position than in the position in which the switch housing 3 can be removed from the fixed part 2 (disconnected position)—as could occur, for example, in the event of an authorized actuation of the actuating shaft 9 after removal of the switch housing 3—the blocking platelet 20, which is arranged in a vertically displaceable fashion, is inserted from above into the guide groove 31 through an opening 24 under the action of a spring (not represented), and blocks access to the guide groove 31 for a profile 33 of a retaining shoe 101 mounted on the housing body 3. The housing body 3 cannot then be displaced along the guide grooves 30, 31. Undesired contacting of the contact pieces 16, 17 with the mating contact pieces is reliably avoided in this way.

It may be seen from FIG. 7 that in the disconnected position a link 190 rigidly connected to the driver carriage 19 guides the blocking platelet out of the guide groove 31 in the direction of the arrow h against the force of the spring (not represented). The guide groove 31 is now no longer blocked, and the profile 33 and thus the housing body can now be displaced along the guide grooves 30 and 31 by rotating the actuating shaft 9.

Figure 8:
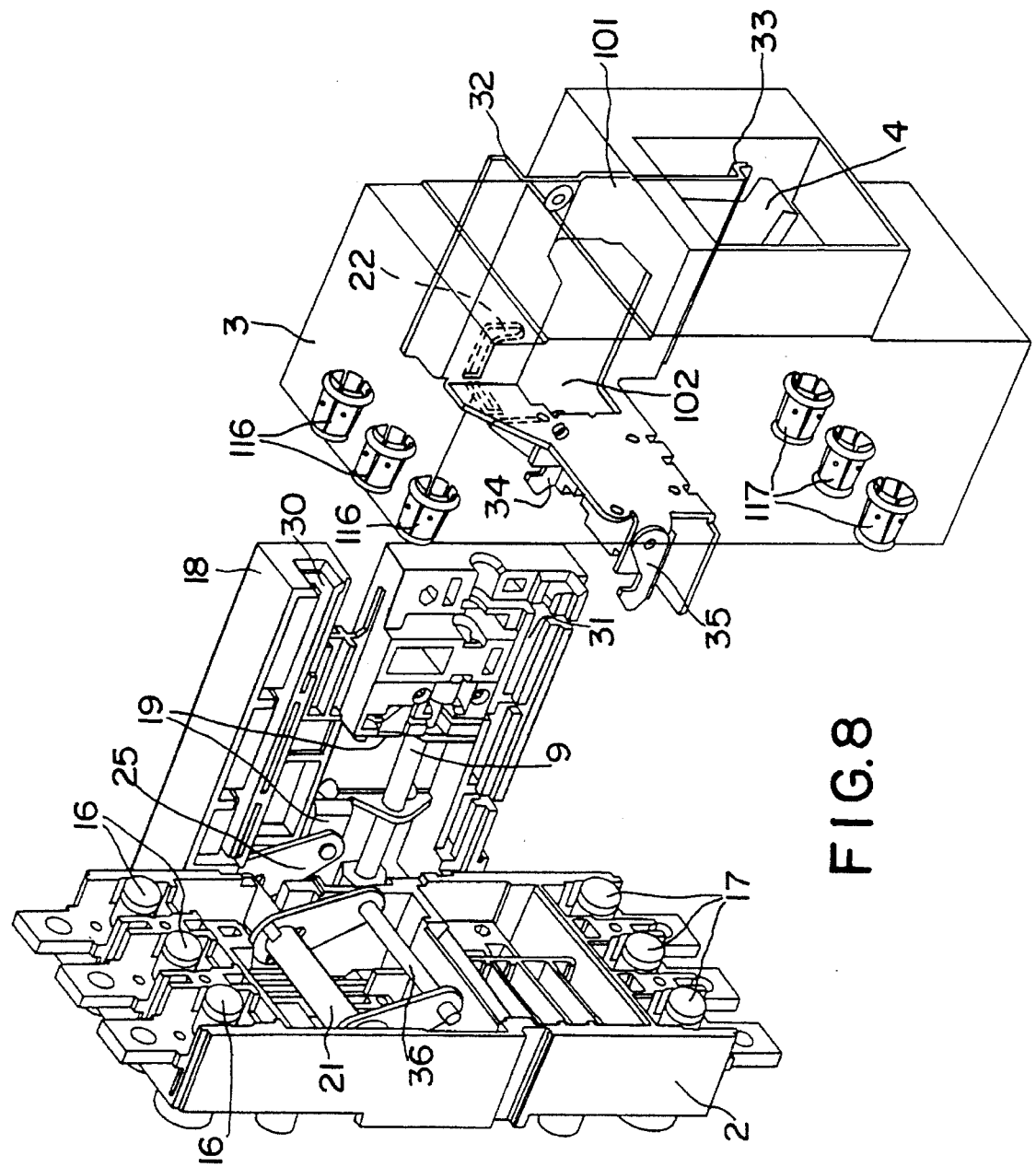
FIG. 8 shows the switch in accordance with FIGS. 3 to 7 in a state in which the housing body is pushed out of the fixed part of the switch.

How the movable housing body 3 and the fixed part 2 of the switch 1 interact can be gathered from FIG. 8. It is to be seen that the retaining shoe 101 with the two profiles 32 and 33, which can be inserted into the guide grooves 30 and 31, is mounted on a side face of the box-shaped housing body 3. Furthermore, rigidly connected to the retaining shoe 101 is a holder 102, which is of angular construction and on which the coupling device is pivotably mounted. In addition to the pivotable hook 22, the coupling device exhibits two further pivotable hooks 34 and 35 which are firmly connected to the hook 22 and when the housing body 3 is inserted are suspended on a bolt 36 of the lever mechanism 21 and thus prevent the housing body 3 from being pushed out of the guide grooves 30 and 31. Also to be seen in FIG. 8 are the mating contact pieces, which are provided with the reference numerals 116 and 117 and interact with the contact pieces 16 and 17.

As may be gathered from FIGS. 9, 10 and 11, the box-shaped housing body 3 and the fixed part 2 of the switch can be mounted in any position, for example a perpendicular or horizontal position. The front of the switch 1, which contains the additional unit 5, can thus be positioned at will.

Figure 12:
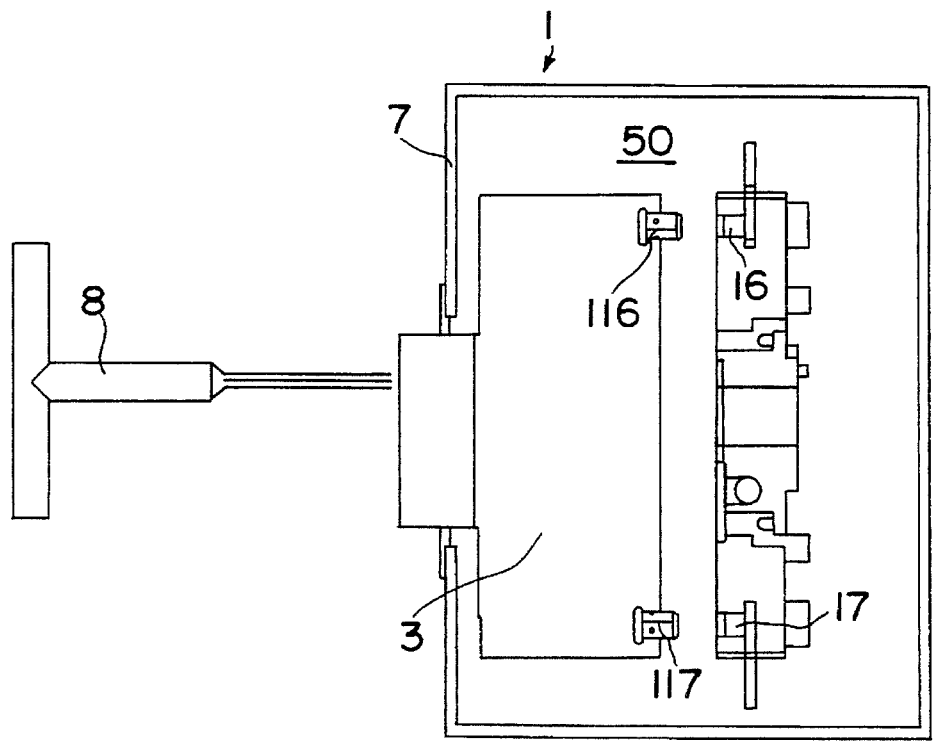
FIGS. 12 and 13 show in a schematic representation the switch in accordance with FIGS. 3 to 8 in the disconnected position and in the connected position.
Figure 13:
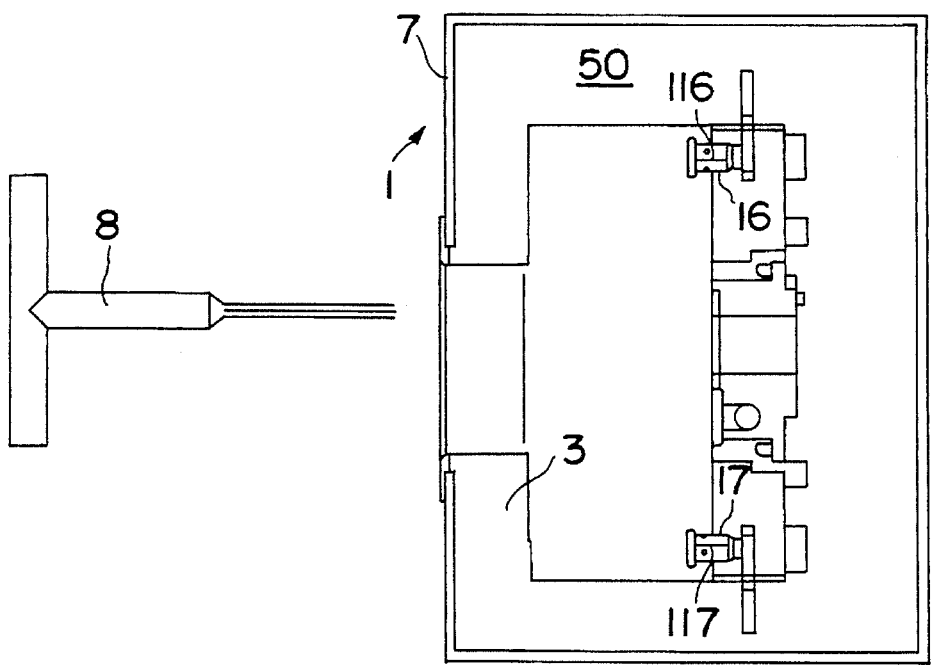

It may be gathered from FIGS. 12 and 13 that the door 7, which closes the switch cabinet designated by the reference numeral 50 does not need to be opened when disconnecting the mating contacts 116 and 117 from the contact pieces 16 and 17, since it is possible with the aid of the tool 8 and of the spindle drive containing the actuating shaft 9 to displace the housing body 3 with the door 7 closed.

The mode of operation of the switch represented in FIGS. 1 to 13 is as follows: with the door 7 open, the housing body 3 containing the opened power contact arrangement of the switch is brought into the switch cabinet. In this case, the profiles 32, 33 of the retaining shoe 101 are firstly inserted into the guide grooves 30 and 31, and the housing body 3 is then inserted into the switch cabinet 50 (FIG. 8). When the housing body 3 is inserted, the control link 23 firstly guides the hook 22 upwards. As a result, the hooks 34, 35 of the coupling device are pivoted downwards. As soon as the hook 22 is guided upon further insertion of the housing body 3 onto the rear part of the control link 23, the hook 22 is pivoted downwards and the hooks 34 and 35 then finally grip the bolt 36 of the lever mechanism 21 from behind. Thereafter, the door 7 of the switch cabinet 50 is closed, and the tool 8 is plugged through the openings 11 and 39 onto the actuating shaft 9. By rotating the actuating shaft 9, the driver carriage 19 is displaced rearwards out of the disconnected position. The driver carriage 19 is thereby guided with its rear end against a pivotably mounted lever arm 25 of the lever mechanism 21 and pivots this lever arm 25 and thus the bolt 36 of the lever mechanism 21 rearwards. The housing body 3 coupled via the hooks 34, 35 is also guided rearwards by this pivoting movement. The tool 8 is rotated clockwise until the torque force becomes noticeably higher after complete contacting of the contact pieces 16, 17 and the mating contact pieces 116, 117 (connected position).

The tool 8 can now be removed, and the switch 1 can be closed by actuating the switching lever 4. During closure, the locking lug 10 is inserted into the opening 11, and thus prevents the tool 8 from being plugged onto the actuating shaft 9. A permissible rotation of the actuating shaft 9 with the switch 1 closed is thus reliably prevented.

Upon disconnection, the switch 1 is opened and the opening 11 is released. The tool 8, which is now plugged onto the actuating shaft 9, is now used to rotate the actuating shaft 9 anticlockwise. The driver carriage 19 is guided forwards by this rotary movement and strikes the retaining shoe 101 with its front end. The retaining shoe 101, and thus also the housing body 3, are now displaced forwards. The lever mechanism 21 is also pivoted forwards again by this movement. The blocking platelet 20 is supported during this operation on the profile 32 and does not impair the movement of the housing body 3. Finally, the link 190 of the driver carriage 19 guides the blocking platelet upwards, and at the same time a further pushing movement of the driver carriage 19, and thus also of the housing body 3, are prevented. The torque now increases abruptly, and the disconnected position is achieved.

The door 7 of the switch cabinet 50 can be opened. Owing to the previously described insertion of the push button 100, the hooks 34 and 35 can be pivoted downwards, and thus the housing body 3 can be mechanically decoupled from the fixed part 2. The housing body 3 can now be removed from the switch cabinet 50. If, now, someone actuates the actuating shaft 9, the blocking platelet 20 jams the guide groove 31 and prevents impermissible insertion of the housing body 3.

Figure 14:
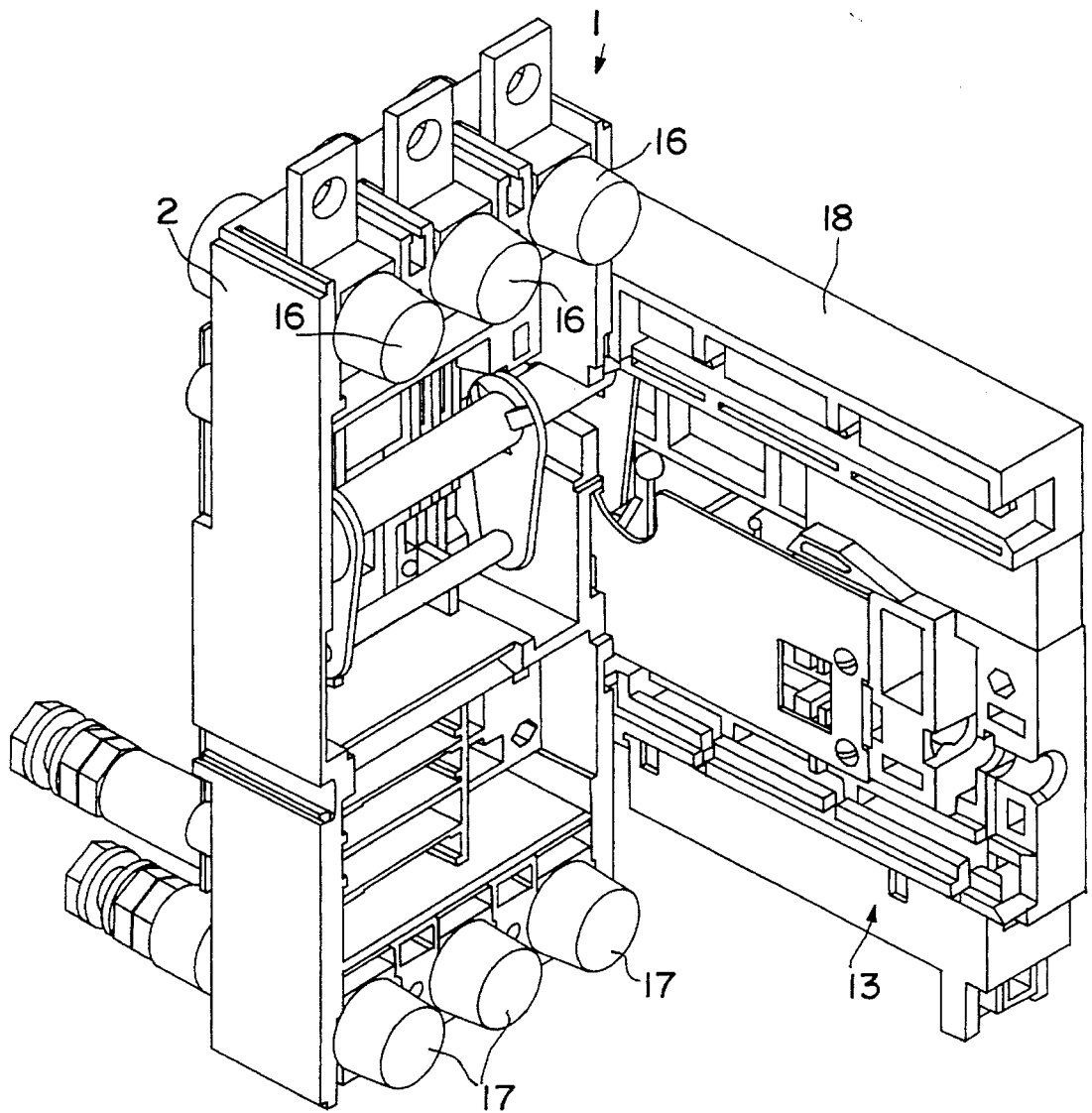
FIG. 14 shows a perspective view of the fixed part of the switch in accordance with FIGS. 3 to 8, which part interacts with an additionally provided safety and blocking device.

FIGS. 14 to 17 represent an embodiment of the switch according to the invention in which—as is to be seen from FIG. 14—the switch additionally exhibits a blocking device 13. This blocking device is intended to prevent the mating contact pieces 116 and 117 of the housing body 3 from inadvertently coming into contact once again in the disconnected position with the contact pieces 16 and 17 of the fixed part 2.

Figure 15:
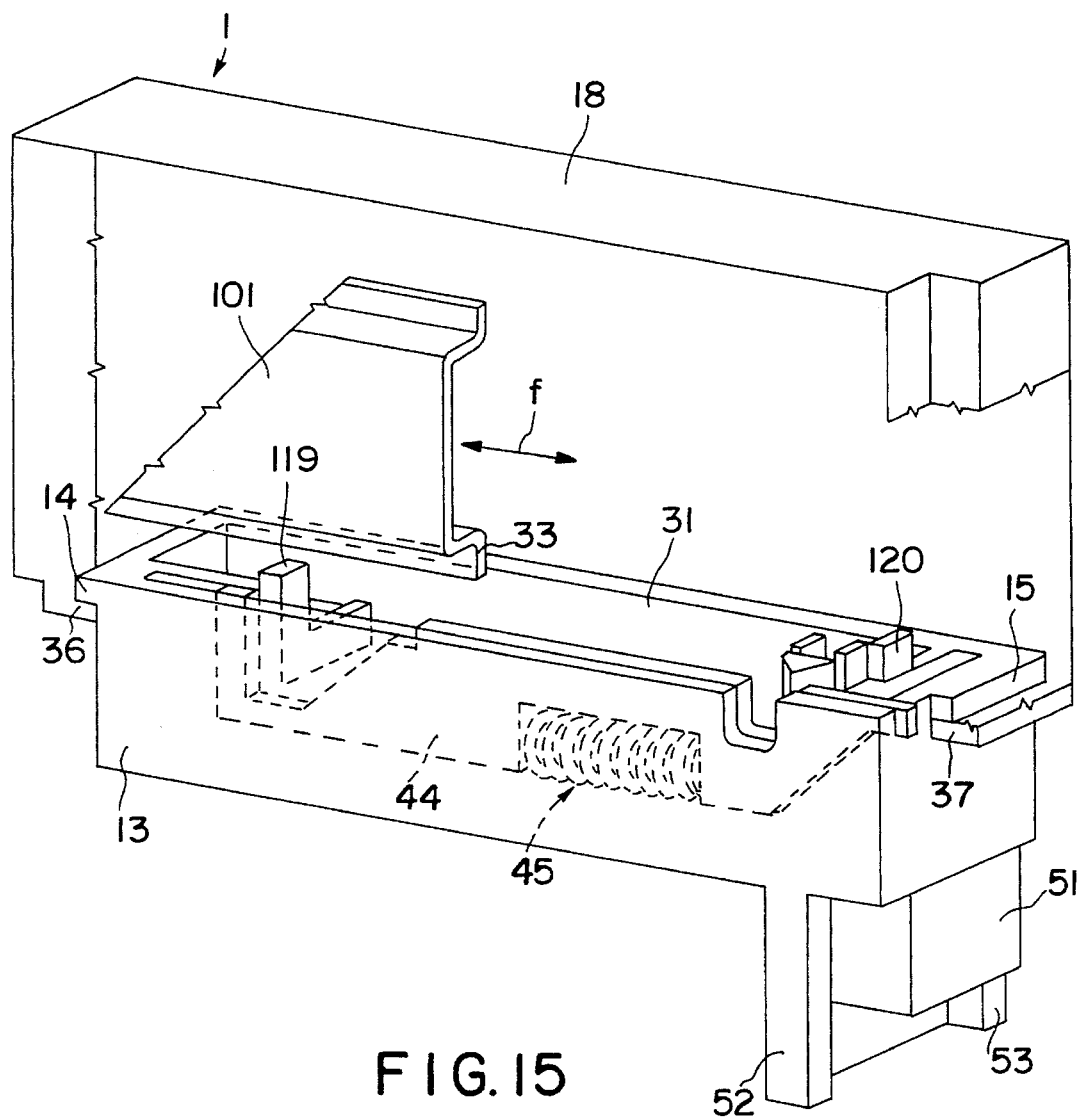
FIGS. 15 and 16 show the safety and blocking device in accordance with FIG. 14 in the inactive and active state.
Figure 16:
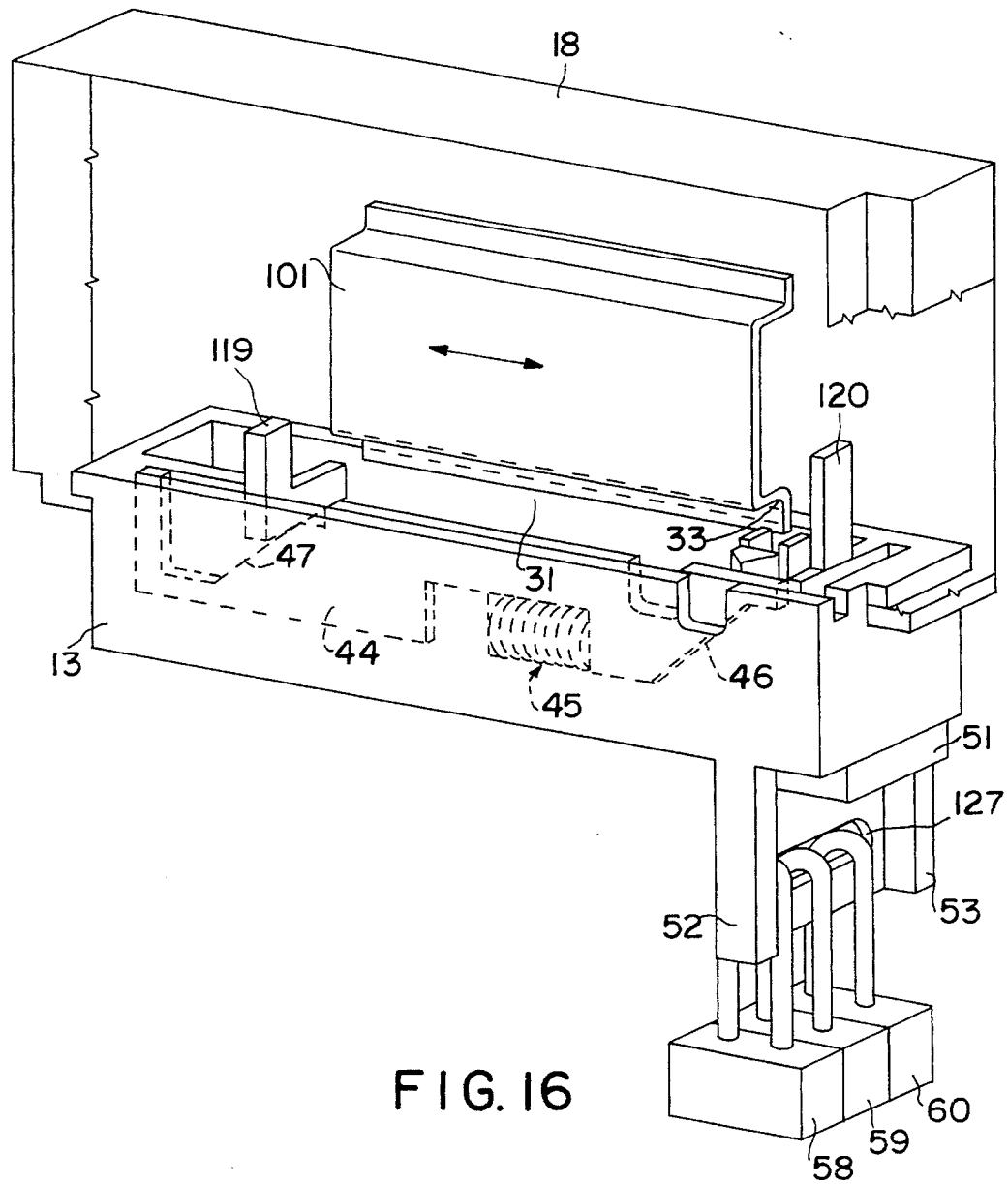
Figure 17:
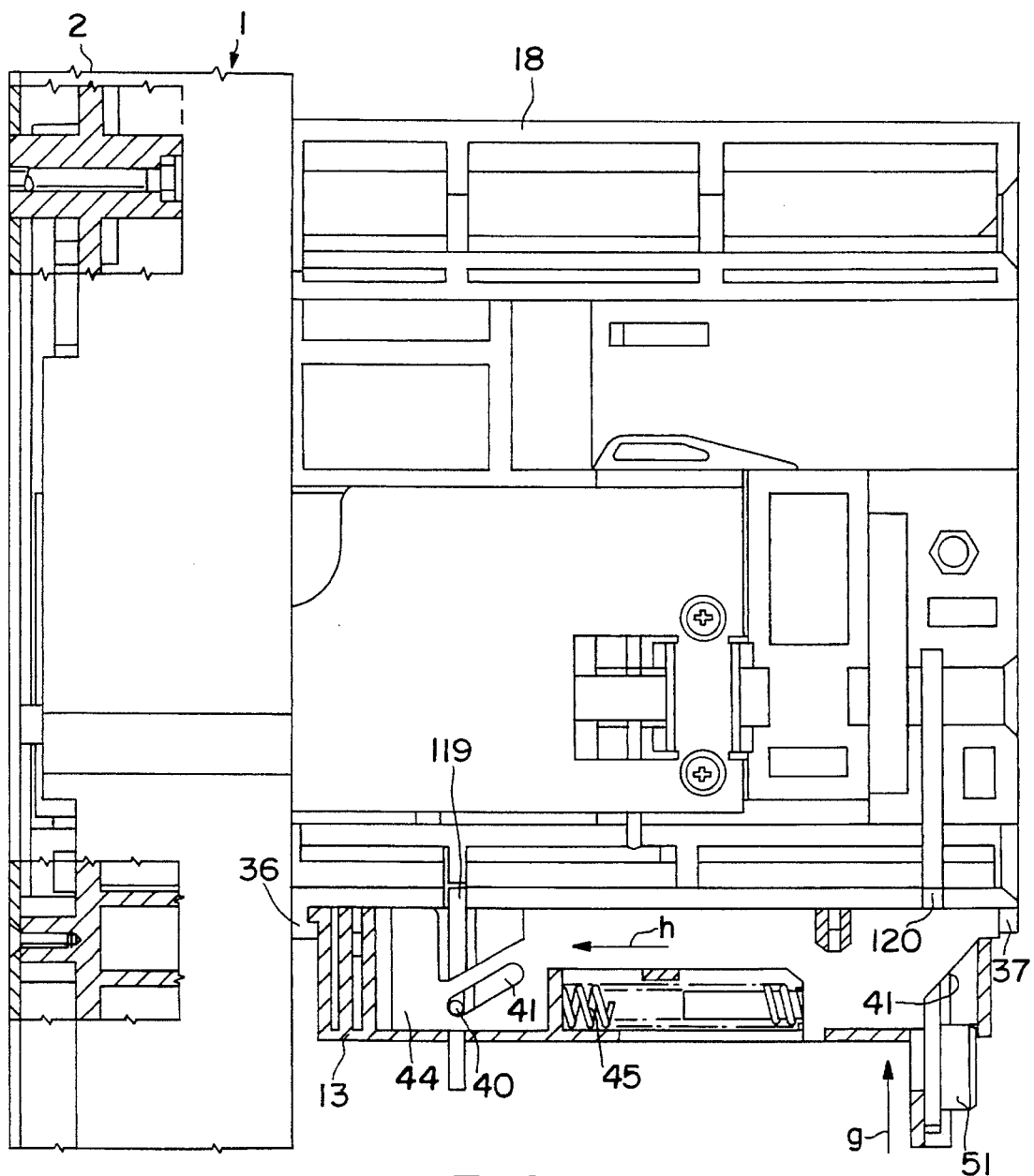
FIG. 17 shows a side view of the fixed part having the additional safety and blocking device in accordance with FIG. 14.

The design and the mode of operation of the blocking device 13 can be gathered from FIGS. 15 to 17. As may be seen from these figures, the safety device 13 is positively connected to the side part 18. The positive connection is achieved by means of two parallel strips 14 and 15, which form an upper lateral boundary of the blocking device 13 and which are fitted into two parallel guides 36 and 37 which are constructed in the shape of grooves and are provided on the underside of the side part.

The blocking device 13 has two latches 119 and 120, which can be displaced in the vertical direction from an inactive position, represented in FIG. 15, in which they permit the free movement of the profile 33 of the retaining shoe 101 in the guide groove 31, into an active position, represented in FIG. 16, in which the retaining shoe 101, and thus the housing body 3, are prevented from being able to move with respect to the fixed side part 18.

On the front, the blocking device 13 contains a push button 51, which is arranged displaceably in parallel guides 52 and 53. The push button 51 acts on a plate 44, which is aligned vertically and in the direction of displacement of the housing body 3 (direction of the double arrow f) and is mounted displaceably in the direction of the arrow f against the action of a compression spring 45 in the interior of the blocking device 13.

The latches 119 and 120 are inactive in the position represented in FIG. 17. When the push button 51 is pushed upwards, as shown by the arrow g, the result is that the plate 44 is moved in the direction indicated by the arrow h against the action of the compression spring 45, and thus the latches 119 and 120 are displaced upwards.

Oblique guides are provided for the purpose of displacing the latches 119 and 120 upwards. As may be seen at the latch 119, the latches 119, 120 advantageously respectively exhibit a small pin 40 which is guided in an obliquely upwardly guided groove or window-shaped opening 41 in the plate 44.

In FIG. 15, the two latches 119 and 120 are inactive, and the push button 51 is not pressed. By contrast, in FIG. 16 the push button 51 is pressed upwards. By actuating the push button 51, the plate 44 was displaced to the left against the action of the self-compressing compression spring 45, and as a result the latches 119 and 120 guided by oblique surfaces 46 and 47 or the window-shaped openings 41 in the plate 44 were guided out of the locking device 13 into the guide groove 31. The retaining shoe 101, and thus also the housing body 3, can now no longer be displaced.

The activation of the push button 51 releases between the parallel guides 52 and 53 a small window-shaped opening 127 which permits padlocks 58, 59 and 60 to be suspended. The number of the padlocks depends on how many people have to work on maintenance and assembly work in different regions of an electrical system controlled by the switch cabinet 50.

Because of the padlocks 58, 59 and 60 which have been suspended, it is therefore impossible for the push button 51 to be guided downwards again under the action of the spring 25, and the result is that the plate 44 is displaced into the inactive state, in which, as represented in FIG. 15, the retaining shoe 101 is displaceably guided. Rather, the push button 51 remains continuously pressed, and the upwardly guided latches 119 and 120 prevent displacement of the retaining shoe 101, and thus cancellation of the disconnected position of the switch 1.

As soon as a first fitter has finished his work on the system, he withdraws his padlock, for example the padlock 58, from the opening 127. The other fitters also correspondingly withdraw their padlocks 59, 60 in succession after finishing their work. When everyone has left the system, the push button switch 51 is finally released and can now run back from its blocked position (FIG. 16) into its release position (FIG. 15).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A switch cabinet, comprising:

a housing;

a door having a first and a second opening;

a box-shaped switch, the switch including a movable switch housing body having first contact members and a fixed part having second contact members, the fixed pan being mounted in the housing, the housing body being movable into the switch cabinet into a connected position in which the first contact members are connected to the second contact members, and being movable from the connected position into a disconnected position in which the first contact members are disconnected from the second contact members, the housing body being removable from the housing when in the disconnected position, the switch having a disconnecting device for moving the housing body between the connected position and the disconnected position, and a switching lever extending through the first opening and movable between a closed and an open position, wherein the disconnecting device cooperates with a tool that is removably inserted in the second opening with the door closed to operate the disconnecting device, the switch further including means for blocking the second opening when the switching lever is moved to a closed position.

2. The switch cabinet as claimed in claim 1, wherein the fixed part is L-shaped and includes a side part defining a limb of the L-shaped fixed part for guiding the housing body when the disconnecting device is driven and for accommodating a part of the disconnecting device, and at least one guide groove is provided in the side part for accommodating a profile of a retaining shoe mounted on the housing body.

3. The switch cabinet as claimed in claim 1, wherein the disconnecting device includes a spindle drive which is mounted on the fixed part, the spindle drive including an actuating shaft and a driver carriage, the actuating shaft being drivable by the tool to move the driver carriage relative to the actuating shaft and cause the driver carriage to move the housing body between the connected position and the disconnected position.

4. The switch cabinet as claimed in claim 3, wherein the disconnecting device includes a coupling device on the housing body for interacting with a lever mechanism on the fixed part to couple the housing body to the fixed part.

5. The switch cabinet as claimed in claim 4, wherein the coupling device includes a pivotable hook and the lever mechanism includes a bolt attached to a lever arm pivotably mounted on the fixed part, the coupling device including means for pivoting the hook to grip the bolt when the housing body is moved toward the connected position, the lever arm being pivoted by the driver carriage when the driver carriage is moved to move the housing body into the connected position.

6. The switch cabinet as claimed in claim 5, wherein the driver carriage includes a link portion for cooperating with a locking element for preventing movement of the housing body when the housing body is in the connected position such that, when the housing body is not in the connected position, the locking element permits movement of the housing body.

7. The switch cabinet as claimed in claim 4, wherein a control link is arranged on the side part such that, when the housing body is moved into the switch cabinet, the coupling device is pivoted by the control link to interact with the lever mechanism to couple the housing body to the fixed pan.

8. The switch cabinet as claimed in claim 7, wherein the control link is displaceable.

9. The switch cabinet as claimed in claim 2, wherein a blocking device is mounted on the side part, the blocking device having at least one latch movable between an inactive position in which the latch permits unhindered movement of the housing body with respect to the fixed part, and an active position in which the latch prevents movement of the housing body with respect to the fixed part of the housing body.

10. The switch cabinet as claimed in claim 9, wherein the latch is supported on a surface arranged obliquely relative to a direction of movement of the housing body, the plate being movable in the direction of displacement to compress a compression spring.

11. The switch cabinet as claimed in claim 10, wherein the blocking device includes a push button for moving the plate to compress the compression spring, and a parallel guide in which the push button is slidably disposed, the parallel guide having an opening which is exposed when the push button is moved to move the plate to compress the compression spring.

* * * * *